Patented Aug. 16, 1949

2,479,389

UNITED STATES PATENT OFFICE 2,479,389

DEFLUORINATION OF PHOSPHATE ROCK

Ernest J. Maust and Clinton A. Hollingsworth, Lakeland, Fla., assignors to Coronet Phosphate Company, New York, N. Y., a corporation of New York No Drawing. Application April 26, 1946, Serial No. 665,344

4 Claims. (Cl. 71—44)

This invention relates to the defluorination of phosphate rock by calcination in the presence of water vapor, and has for its object the provision of certain improvements in that process.

Fluorine is present in practically all native phosphate rock, in amount varying in the different areas in which it occurs. The common Florida phosphate rock (e. g. pebble rock) usually contains from 3.5 to 4% of fluorine, around 75% bone phosphate of lime (B. P. L.), around 5% silica, around 5% calcium carbonate, around 2% iron and aluminum oxides, and the balance organic matter and other impurities. The fluorine is commonly believed to be present as calcium fluoride and also combined with the tricalcium phosphate as calcium fluorphosphate or fluorapatite ($Ca_{10}F_2(PO_4)_6$), and this combination is believed to be largely responsible for the low fertilizer availability of the raw rock (or concentrate), as evidenced by the customary ammonium citrate solubility test. Moreover, the high fluorine content of the raw rock makes it unsuitable as an animal feed or mineral supplement. Among the many proposals for defluorinating raw phosphate rock, the calcination process in the presence of silica and water vapor has heretofore appeared the most promising and a vast amount of work has been done in the endeavor to commercialize that process.

The presence of silica, usually in relatively large amount, has heretofore been considered essential in refluorinating phosphate rock by the action of water vapor. Various explanations of the action of silica in the defluorinating process have been advanced. Thus, it has been asserted that silica, sometimes in conjunction with calcium carbonate, sodium or potassium sulphate or other agents, was necessary in order to break the bond of the apatite lattice and free the fluorine. In some quarters, it was believed that the silica was necessary for combination with the free limestone or calcium carbonate, or with the compounds of iron and aluminum customarily present in most phosphate rocks. In other quarters, silica was believed necessary in order to combine with the fluorine. In the United States Letters Patent of one of us (Maust) No. 2,446,978, patented August 10, 1948, it was recognized, contrary to the then general belief, that the action of the silica is mainly mechanical to keep the particles of rock separated and thereby prevent their fusion and consequent failure of intimate contact with water vapor, and the defluorinating process of that application accordingly involves the admixture with the phosphate rock of from 35 to 45% by weight of silica and a calcining temperature of from 2600 to 3000° F.

As the result of an exhaustive investigation of the subject, we have found that the presence of silica in amount up to about 30% generally promotes fusion of the phosphate rock at temperatures too low for effective defluorination. In the aforementioned Maust patent application, such a large amount of silica is mixed with the phosphate rock as to minimize contact of the rock particles with one another and consequently fusion and sticking together of the particles is thus avoided. We have now discovered that if the silica content of the phosphate rock is sufficiently low, effective defluorination by calcination in the presence of water vapor is possible at temperatures in excess of 2500° F. without encountering fusion and without the necessity of carefully controlling the calcining temperature which may ultimately rise to approximately 3000° F. Thus, we have discovered that if little or no silica is present in the phosphate rock, there is then nothing in the rock to cause fusion at the temperatures necessary to remove the fluorine by the action of water vapor, and the reaction between the water vapor and fluorine content of the rock proceeds unimpeded by fusion. We have found that the silica content of the rock should be less than 4%, and preferably less than 3%. Since most native phosphate rocks contain substantially larger percentages of silica, the silica must be removed, at least in part.

The following table gives a typical analysis for several phosphate rocks mined in the United States:

|  | Fla. Pebble | Fla. Hard Rock | Tenn. Brown | Tenn. Blue | Wyoming |
|---|---|---|---|---|---|
| $P_2O_5$ | 31.62 | 35.81 | 34.06 | 30.83 | 30.08 |
| CaO | 47.69 | 50.82 | 48.08 | 45.17 | 46.05 |
| $F_2$ | 3.87 | 3.87 | 3.75 | 3.85 | 3.48 |
| $SiO_2$ | 8.98 | 4.98 | 7.56 | 9.09 | 7.16 |
| $Al_2O_3$ | 1.00 | 0.52 | 1.80 | 1.21 | 1.19 |
| $Fe_2O_3$ | 1.63 | 0.69 | 2.27 | 3.40 | .87 |
| $CO_2$ | 3.66 | 2.16 | 1.73 | 2.58 | 4.12 |
| $SO_3$ | 1.37 | 0.56 | .82 | 6.61 | 3.06 |
| $H_2O$ at 100° C | | 0.50 | | 0.46 | 0.35 |

The fusion temperatures of the different constituents of these rocks are as follows:

°F.
$Ca_3(PO_4)_2$ _____ 3038
$Fe_2O_3$ _____ [1] 2840
$Al_2O_3$ _____ 3800
CaO _____ 4650

[1] Decomposes.

It will therefore be seen that if there is nothing (such as silica) present to combine with the oxides of calcium, iron and aluminum, fusion will not take place at defluorinating temperatures of from 2500 to approximately 3000° F., and in the absence of fusion water vapor is able to penetrate the phosphate rock, preferably nodulized, and react with the fluorine as follows:

$$2H_2O + 2F_2 \rightarrow 4HF + O_2$$

Based on the foregoing discoveries, our present invention involves calcining, in the presence of water vapor, a charge composed predominantly of finely divided phosphate rock (or equivalent phosphatic material containing fluorine) and containing less than 4%, and preferably less than 3%, of silica at a temperature of at least 2700° F. but insufficient to cause any substantial fusion of the charge. The calcining temperature is preferably between about 2700° F. and about 3000° F., within which temperature range substantial defluorination is effected in from 10 to 30 minutes. It is essential that the water vapor penetrate to all parts of the charge during the entire period of defluorination.

Most phosphate rocks, as mined, contain too high a silica content for direct treatment in accordance with the present invention. Silica may be removed to the necessary extent in any appropriate manner, as, for example, by flotation, electrostatic separation, sorting, or other silica-separating process. In most cases, the phosphate rock must be crushed and ground to a proper fineness to liberate mechanically bound but free silica, a fineness of minus 48 mesh (standard Tyler screen) being generally adequate, although with some rocks a fineness of minus 200 mesh is necessary. Since for defluorination it is desirable that the rock be ground so that at least 65% passes through a 200 mesh screen and all passes through a 65 mesh screen, it is advantageous where possible to grind the rock to such a fineness in preparation for the removal of silica. By "free silica" is meant that present as "pimples" in the phosphate rock and plainly seen by means of either the naked eye or a microscope. The "combined silica" is that present in combination with other elements, and which cannot be removed by the ordinary silica-separating processes. It seldom is present in excess of 2%, and often is under 1%.

In the phosphate industry, silica is customarily determined as "insoluble matter" in one part of concentrated hydrochloric acid and one part of water at boiling temperature. The insoluble matter will consist for the most part of silica but may, and usually will, contain a relatively small amount of other insoluble substances. So far as the practice of the present invention is concerned, these other insoluble substances are unobjectionable and probably act in much the same manner as silica. Since in commercial practice, determinations of insoluble matter are more usual and more readily made than determinations of silica, it is generally more convenient, in practicing the invention, to consider the insoluble matter as the equivalent of silica, and throughout this specification and the appended claims the contemplated low percentages of silica in the calcining charge are to be considered as in the form of insoluble matter.

In carrying out the invention, the phosphate rock should be in a finely divided state, preferably so that at least 65% passes through a 200 mesh standard Tyler screen and all passes through a 65 mesh screen. While the phosphate rock of low silica content may be calcined in its finely divided form, superior results are generally attained by forming the finely divided rock into nodules, pellets, briquets or the like. Nodulizing or the like may be carried out as a preliminary or preparatory operation or may be effected in situ immediately preceding calcination. For example, suitable nodules, generally round in shape and varying in diameter from 1/16 to 1 inch, may be made by moistening the finely divided rock with water or other suitable liquid and tumbling at room temperature in a rotating cylinder, barrel or the like. From 12 to 18% by weight of water or the like, and generally around 15%, will sufficiently moisten the dry finely divided rock for producing satisfactory nodules by tumbling. Nodules may also be made by drying an aqueous slurry of the rock, and cutting the dried product into suitably sized cubes or other shapes. Nodules may also be made mechanically by briquetting or the like, although nodules so produced are generally too dense or compact for effective subsequent penetration of the water vapor. When calcination is carried out in a rotary kiln, nodulizing may conveniently be effected in situ by making a slurry of the finely divided phosphate rock with from 40 to 50% by weight of water, and heating the slurry and evaporating the water in the low temperature end of the rotating kiln.

Calcination can be carried out in any suitable apparatus, such as a rotary kiln, electric furnace, shaft furnace, sintering machine etc. The multiple hearth shaft furnace disclosed in the copending patent application of one of us (Maust), Ser. No. 679,178, filed June 25, 1946, is a particularly suitable apparatus for the practice of the invention. In whatever apparatus employed, intimate and continuous association of the water vapor with the entire body or charge of phosphatic material undergoing calcination is necessary. As rapidly as water vapor is consumed in the operation, fresh water vapor must be available to instantly replace that consumed, and free evolution of the resulting gaseous products (e. g. fluorine or hydrogen fluoride, carbon dioxide, sulphur oxides etc.) is necessary. Heating in the presence of water vapor is thus continued until the desired elimination of fluorine is attained. In general, the higher the temperature of calcination the shorter is the required detention period at that temperature to effect the contemplated defluorination.

The invention, in its broad aspect, is illustrated in the following examples in which the phosphate rock was a Florida pebble phosphate which had been subjected to flotation to remove silica. The analysis of the resulting low-silica rock was as follows:

|  | Per cent |
|---|---|
| Total $P_2O_5$ | 35.53 |
| Insoluble ($SiO_2$) | 2.68 |
| $Fe_2O_3$ and $Al_2O_3$ | 2.11 |
| Fluorine | 3.84 |
| Fineness | [1] 74 |

[1] Minus 200 mesh.

The finely ground phosphate rock was nodulized in a cylindrical rotating nodulizer by means of a spray of water. Bentonite (0.5% by weight) was added to the dry ground phosphate rock in order to give the nodules residual strength after drying as well as during calcination. The dry nodules were calcined in an electric furnace through which water vapor was continuously passed in intimate contact with the hot nodules. Twenty minutes were taken in gradually bringing the nodules up to the calcining temperatures indicated in the following table:

| Time held at calcining temperature | Per cent Fluorine with calcining temperature of— | | |
|---|---|---|---|
| | 2700° F. | 2800° F. | 2900° F. |
| 2.5 minutes | 0.96 | 0.72 | 0.61 |
| 5.0 minutes | 0.92 | 0.68 | 0.37 |
| 10.0 minutes | 0.70 | 0.55 | 0.24 |

The foregoing examples show that it is necessary to calcine the low-silica phosphate rock at a temperature of about 2900° F. in order to obtain substantial defluorination. However, in accordance with the invention as represented by the foregoing example, the phosphate rock did not fuse at that calcining temperature. On the other hand, with the same Florida pebble phosphate having a customary silica content of about 6% hopeless fusion takes place at a temperature of even 2700° F. thus preventing reaction of the water vapor within the interior of a nodule, and making a sticky mass that is unworkable in commercial rotary kilns or other furnaces.

Substantial fusion or sintering of the calcining charge is to be considered as fusion or sintering to such an extent that the charge becomes sticky, in whole or in part, and tends to cling or stick to the wall of the calcining apparatus. Fusion may also be defined as a condition where for a given time period of treatment a higher fluorine content results than from treating for the same time period at a lower temperature. Substantial fusion or sintering at temperatures below that required for effective defluorination impedes and usually prevents substantially complete defluorination. Fusion of a phosphate rock nodule (during calcination) is plainly evidenced by the appearance of the nodule after being removed from the furnace. If fused, it will have a glassy appearance, and will usually be full of bubbles where expanding gases, such as carbon dioxide, fluorine and sulphur oxides, have attempted to escape, but were prevented in doing so by the fusion on the surface of the nodule. When fusion takes place, the nodules contacting with the furnace refractory or lining generally stick thereto, and the refractory is frequently ruined in subsequently removing the tenaciously adhering nodules. Fusion of the nodule is also evidenced by the fluorine content of the calcined nodule. When the fluorine content of a calcined nodule is higher than for a similar nodule calcined for the same time at a higher temperature, it is a sign that fusion took place when the nodule first entered the hot zone of calcination thereby substantially preventing further defluorination of the nodule.

The following examples illustrate the manner in which fusion develops in the calcination of a Florida pebble phosphate with increasing amounts of silica. A phosphate rock which had its silica content reduced to 2.01% by flotation was used in these examples. To the finely ground low-silica phosphate rock, silica in various amounts was added to give charges (subjected to calcination) of increasing silica contents. In these examples, the finely ground phosphate rock was mixed with finely ground bituminous coal, the mixture nodulized into balls about ⅜" in diameter, and the nodules heated in the presence of water vapor at a temperature exceeding 1800° C. to eliminate the carbon of the coal and thereby impart a high degree of porosity to the nodules, as more particularly described hereinafter. Bentonite (0.5%) was also included in the mixture for imparting strength to the decarbonized nodules.

| Minutes at Calcining Temp. | Calcining Temp. | Percent fluorine after calcination when nodulized charge contained $SiO_2$ in amount of— | | | | |
|---|---|---|---|---|---|---|
| | | 2.01% | 3.47% | 4.94% | 6.40% | 8.06% |
| | °F. | | | | | |
| 10 | 2,600 | 1.28 | 1.28 | .78 | .86 | .51 |
| 15 | 2,600 | .62 | .62 | .27 | .33 | .08 |
| 20 | 2,600 | .35 | .29 | .05 | .05 | .06 |
| 25 | 2,600 | .12 | .07 | .03 | .03 | |
| 10 | 2,700 | .64 | .70 | 1.36¹ | .86 F | Melted |
| 15 | 2,700 | .19 | .19 | 1.24 | F | |
| 20 | 2,700 | .12 | .11 | 1.09 | | |

¹ Slightly fused.
F, Fused.

The foregoing examples demonstrate the advantage of silica in the defluorination of phosphate rock, according to prior art practices, from the standpoint of accelerating the elimination of fluorine at controlled low temperatures, such as 2600° F. However, we have found in actual kiln operations that the calcining temperature cannot be closely controlled to take advantage of the beneficial effects of silica, and that the effective time for a nodule to remain in the hottest zone of calcination and be contacted with water vapor is of the order of six minutes. Hence in the present invention, we find it advantageous not to rely upon the beneficial effects of silica, but rather to go to much higher final calcining temperatures, e. g. in the neighborhood of 2900° F., thus stretching out the hot zones of 2800° F., 2700° F., 2600° F. and 2500° F., without substantial fusion of the phosphatic material undergoing calcination, so that the period at which water vapor can effectively react with fluorine is greatly extended, and we do not encounter the fusion problem that prevents good kiln operation.

When the calcining charge is nodulized, the nodules should have a high degree of porosity in order that the water vapor may effectively penetrate throughout the entire mass of each individual nodule during calcination and defluorination. Such porosity may advantageously be imparted to the nodules by the invention of our copending patent application Ser. No. 665,348, filed April 26, 1946. In accordance with that invention, a highly effective porosity is imparted to the nodules by including from 5 to 50% by weight of carbonaceous material in the nodules and eliminating substantially all of the carbon of the carbonaceous material by reaction with water vapor at a temperature in excess of 1800° F. with evolution of the resulting gaseous products. At that temperature, the water vapor reacts with the hot carbon of the carbonaceous material with the evolution of hydrogen and carbon monoxide, in much the same way that water gas is formed. The heat treatment in the presence of water vapor is continued until the nodules are decarbonized for all practical purposes, that is until substantially all of the carbon has been eliminated, leaving the nodules with the desired degree of porosity. The decarbonizing temperature may advantageously be from 2000 to 2400° F. Too high a temperature should be avoided, since it may cause a loss of phosphorus through reduction of the phosphatic material by carbon, or may cause such substantial fusion or sintering of the nodules as to impede effective penetration of the water vapor throughout the mass of each individual nodule, with the result that all of the carbon is not eliminated. On the other hand, a slight amount of sintering is advantageous since it imparts a desired amount of strength to the decarbonized porous nodules. Thus, in the case of most finely divided phosphate rocks, incipient sintering takes place at about the same temperatures at which the water vapor reacts with the carbonaceous material, and this slight incipient sintering is sufficient to convert the nodules into relatively hard clinkers. Hence, when porosity is attained by the removal of carbon, the clinkered nodules are sufficiently strong to withstand subsequent handling in the calcining kiln or furnace without disintegration.

A wide variety of carbonaceous materials are available for imparting porosity to the nodulized charge. Among these may be mentioned, by way of example, bituminous or anthracite coal, coke, charcoal, lamp black and other forms of carbon, liquid and solid petroleum products, waste sulphite liquor, flour, distillery slops, sawdust, ground up grape fruit peelings etc. Solid carbonaceous materials are crushed (when necessary) and finely ground, preferably so that at least 75% passes through a 200 mesh standard Tyler screen, and substantially all passes through a 65 mesh screen. At least 5% by weight of carbonaceous material is required to impart any effective degree of porosity to the nodules, and generally at least 10% is preferred. The higher the percentage of carbonaceous material initially included in the nodules, the higher will be the porosity of the decarbonized nodules. In practicing the present invention with phosphate rock charges containing less than 4% of silica, the nodules may initially contain up to 50% by weight of carbonaceous material, from 20 to 40% by weight usually giving satisfactory results.

When porosity is imparted to a nodulized charge by the initial inclusion of a substantial amount of carbonaceous material and subsequent decarbonization, substantially complete defluorination can often be effected at a lower calcining temperature than otherwise possible, as illustrated in the following examples where the calcining temperature was 2600° F. Since we have observed that decarbonized nodules which have been cooled appear to fuse at a lower temperature than if not cooled, we prefer to directly subject the decarbonized nodules, without intermediate cooling and without substantial loss of heat, to defluorination. The phosphate rock used in these examples was a Virginia apatite of the following analysis:

| | Percent |
|---|---|
| Total $P_2O_5$ | 40.30 |
| Insoluble ($SiO_2$) | 3.77 |
| $Fe_2O_3$ and $Al_2O_3$ | 1.26 |
| Fluorine | 2.52 |
| Fineness | [1] 69.2 |

[1] Minus 200 mesh.

The coal was a high grade bituminous coal (volatile matter 29.1% and ash 7.2%) and was crushed to a fineness of 83.4% minus 200 mesh. The finely ground phosphate rock and coal (and 0.5% bentonite in each case) were intimately mixed together in different proportions. The mixture was made in the form of a slurry, dried and cut-up into ¾ inch cubes. The cube nodules were first heated at a decarbonizing temperature increasing from 1800° F. to 2500° F., in an electric furnace through which water vapor under a slight pressure was continuously passed, until all of the carbon was eliminated. The temperature of the furnace was then raised to the defluorinating temperature of 2600° F., and the nodules were held at that temperature in the presence of water vapor under a slight-pressure for the varying indicated time intervals, the residual fluorine content being determined after each of these different periods of calcination. The slight water vapor pressure was needed to assure direct penetration of the nodule with water vapor to both remove the coal by destructive reaction with the water vapor and to remove the fluorine by the action of the water vapor.

| Minutes at Calcining Temp. | Percent fluorine after varying times of calcination with— | | | |
|---|---|---|---|---|
| | No coal | 20% coal | 30% coal | 40% coal |
| 3.5 | | 1.42 | 1.22 | 1.04 |
| 7 | 1.58 | .76 | .54 | .32 |
| 14 | 1.00 | .16 | .07 | .06 |
| 20 | .86 | .04 | .02 | .01 |

The defluorinated product must be cooled rapidly to prevent the tricalcium phosphate in the product reverting from its alpha form back to its original insoluble beta form. The alpha form is available as a fertilizer whereas the beta form is not. The cooled defluorinated product, in the form of individual clinkered nodules where the calcining charge is nodulized, is finely ground and is then ready for marketing and use as a mineral supplement in animal feeds or as a fertilizer of high available phosphate ($P_2O_5$) content.

The fluorine compounds (i. e. hydrogen fluoride (HF) and silicon tetra-fluoride ($SiF_4$)) in the gaseous product of the calcining operation may be scrubbed with water for recovery of the fluorine in the form of hydrofluoric acid, or may be reacted with a suitable substance, such as calcium carbonate, sodium carbonate, sodium hydroxide, aluminum oxide, etc., for recovery in the form of fluorides, or may be otherwise appropriately recovered.

As hereinbefore mentioned, we prefer, when nodulizing the calcining charge, to include from 0.5 to 2.0% by weight of bentonite in the charge mixture in order to impart a desirable degree of hardness and strength to the dried nodules to withstand subsequent handling, and to prevent objectionable dusting of the nodulized charge during calcination, especially in a rotary kiln. Some phosphate rocks, such for example as Florida pebble rock and especially the phosphate rocks from North Africa, have when finely ground sufficient natural colloidal constituents to form strong nodules upon drying, and hence require but a small addition (e. g. 0.5%) of bentonite. On the other hand, phosphate rocks of the apatite type have little or no natural colloidal constituents, and as much as 2% by weight of bentonite may advantageously be included in the calcining charge to impart the desired degree of strength to the dried nodules.

While we prefer to impart porosity to a nodulized calcining charge by decarbonization of initially included carbonaceous material, as hereinbefore described, a desired degree of porosity may be obtained by including in the calcining charge some substance that volatilizes upon the application of heat, such as ammonium carbonate, or sulphur which burns off as sulphur dioxide, or one of a large variety of high fusion sulphates, carbonates, fluorides etc. which lose water of hydration upon heating. Porosity may also be obtained by mechanical means such as the addition of a frothing agent to an aqueous slurry of the charge mixture, and then vigorously agitating the slurry, whereupon the slurry dries with a fluffy or porous structure.

The following examples illustrate the benefit, in practicing the invention, of imparting porosity to the nodules by a frothing or fluffing-up treatment. In these examples, a low insoluble (2.68%) Florida pebble rock was used, having approximately the same analysis as hereinbefore recited. The finely divided rock was made into a slurry using approximately 35% water. In Example I, the slurry was dried and cut into ⅜ inch cubes. In Example II, a soya bean extract was added to the slurry, and the slurry was agitated or fluffed-up, dried and cut into ⅜ inch cubes. In Example III, egg albumen was added to the slurry, which was then fluffed-up, dried and cut into ⅜ inch cubes. Since the fluffed-up slurry has little strength upon drying, a hardening agent (starch or flour) was added to the slurry in Examples II and III. The porous cube nodules should be quickly heated to a temperature of 2000–2200° F., at which slight sintering takes place, in order to retain their form and porosity after the organic hardening agent burns off. In each example, the nodules were heated at a temperature of 2700° F. in the presence of water vapor, and the fluorine content determined after the indicated time intervals.

| Example | Percent fluorine after calcination at 2700° F. for— | |
|---|---|---|
| | 5 minutes | 10 minutes |
| I | 1.60 | 1.44 |
| II | .07 | .03 |
| III | .06 | .02 |

We claim:

1. The method of defluorinating a phosphate rock containing silica in excess of 4% and fluorine in excess of 1%, which comprises subjecting the rock to a silica-removing treatment and reducing its silica content to less than 4%, calcining without substantial fusion a charge composed predominantly of the treated rock and containing less than 4% of silica at a temperature of at least 2700° F. but not so high that substantial fusion takes place, and subjecting all parts of the charge to the action of water vapor during the period of calcination.

2. The method of defluorinating a phosphate rock containing silica in excess of 4% and fluorine in excess of 1%, which comprises subjecting the rock to a silica-removing treatment and reducing its silica content to less than 4%, calcining at a temperature between about 2700° F. and about 3000° F. without substantial fusion a charge containing less than 4% of silica and composed predominantly of the treated rock ground to a fineness of at least 65% through 200 mesh, and subjecting all parts of the charge to the action of water vapor during the period of calcination.

3. The method of defluorinating a phosphate rock containing silica in excess of 4% and fluorine in excess of 1%, which comprises subjecting the rock to a silica-removing treatment and reducing its silica content to less than 4%, calcining without substantial fusion a charge in the form of porous nodules containing less than 4% of silica and composed predominantly of the treated rock, the calcining temperature being at least 2700° F. but not so high that substantial fusion of the charge takes place, and subjecting all parts of the charge to the action of water vapor during the period of calcination.

4. The method of defluorinating a phosphate rock containing silica in excess of 3% and fluorine in excess of 1%, which comprises subjecting the rock to a silica-removing treatment and reducing its silica content to less than 3%, calcining without substantial fusion a charge containing less than 3% silica and composed predominantly of the treated rock at a temperature between about 2700° F. and about 3000° F., and subjecting all parts of the charge to the action of water vapor during the period of calcination.

ERNEST J. MAUST.
CLINTON A. HOLLINGSWORTH.

REFERENCES CITED

The following references are of record in the file of this patent:

UNITED STATES PATENTS

| Number | Name | Date |
|---|---|---|
| 1,032,763 | Newberry et al. | July 16, 1912 |
| 1,396,149 | Soper | Nov. 8, 1921 |
| 1,902,832 | Caldwell | Mar. 28, 1933 |
| 2,093,176 | Tromel | Sept. 14, 1937 |
| 2,162,609 | Dawe | June 13, 1939 |
| 2,189,248 | Luscher | Feb. 6, 1940 |
| 2,279,033 | Dolbear | Apr. 7, 1942 |
| 2,283,174 | Bates | May 19, 1942 |

FOREIGN PATENTS

| Number | Country | Date |
|---|---|---|
| 418,788 | Great Britain | Oct. 31, 1934 |
| 424,045 | Great Britain | Feb. 13, 1935 |

OTHER REFERENCES

Marshall et al.: "Industrial and Engineering Chemistry," vol. 27, No. 2 (1935), pages 205–209.